United States Patent [19]

Lee et al.

[11] Patent Number: 4,689,389
[45] Date of Patent: Aug. 25, 1987

[54] CURABLE LIQUID COMPOSITIONS OF EPOXY-AND MERCAPTAN-TERMINATED POLYMERS

[75] Inventors: Timothy C. P. Lee, Kenilworth; Thomas M. Rees, Alcester, both of England

[73] Assignee: Morton Thiokol, Limited, Coventry, England

[21] Appl. No.: 753,748

[22] Filed: Jul. 10, 1985

[30] Foreign Application Priority Data

Jul. 26, 1984 [GB] United Kingdom ................ 8419036

[51] Int. Cl.[4] ...................... C08G 59/66; C08G 81/00
[52] U.S. Cl. ..................................... 528/109; 528/374
[58] Field of Search ............... 525/523, 535, 116, 537; 528/109, 374

[56] References Cited

U.S. PATENT DOCUMENTS

| | | | |
|---|---|---|---|
| 2,789,958 | 4/1957 | Feties et al. ..................... | 528/109 X |
| 2,849,416 | 8/1958 | Bender et al. .......................... | 260/43 |
| 3,101,326 | 8/1963 | Montesano et al. .................. | 260/43 |
| 3,291,776 | 12/1966 | Newey et al. .................. | 528/109 X |
| 3,316,324 | 4/1967 | Mendoyanis . | |
| 3,700,645 | 10/1972 | Fukuoka et al. ................. | 528/109 X |
| 3,882,091 | 5/1975 | Villa .................................... | 528/374 |
| 4,092,293 | 5/1978 | Harris et al. .................... | 528/109 X |
| 4,156,752 | 5/1979 | Riccitiello et al. .............. | 523/440 X |
| 4,214,067 | 7/1980 | Packer ............................. | 525/535 X |
| 4,260,720 | 4/1981 | Bosso et al. ........................ | 528/109 |
| 4,595,714 | 6/1986 | McAllister et al. . | |

FOREIGN PATENT DOCUMENTS

| | | |
|---|---|---|
| 0089488 | of 0000 | European Pat. Off. . |
| 0092728 | 11/1983 | European Pat. Off. . |
| 56-74156 | 6/1981 | Japan . |
| WO84/02714 | of 0000 | World Int. Prop. O. . |
| 730670 | 5/1955 | United Kingdom . |
| 755944 | 8/1956 | United Kingdom . |
| 787022 | 11/1957 | United Kingdom . |
| 918373 | 2/1963 | United Kingdom . |
| 1003842 | 9/1965 | United Kingdom . |
| 1146597 | 3/1969 | United Kingdom . |
| 1280661 | 12/1969 | United Kingdom . |
| 1432710 | 4/1976 | United Kingdom . |
| 2061952 | 5/1981 | United Kingdom . |

OTHER PUBLICATIONS

U.K. Search Report (cites all foreign patent documents in file).

*Primary Examiner*—Earl Nielsen
*Attorney, Agent, or Firm*—George Wheeler; Gerald K. White

[57] ABSTRACT

Stable liquid adduct compositons are prepared by an addition reaction between epoxy-terminated polymers and mercaptan-terminated polymers. One of the polymers is in stoichiometric excess so that the composition has free epoxy or mercaptan functional groups. The liquid polymer composition can be stored for long periods before curing with a curing agent reactive with the free functional groups.

23 Claims, No Drawings

CURABLE LIQUID COMPOSITIONS OF EPOXY-AND MERCAPTAN-TERMINATED POLYMERS

BACKGROUND OF THE INVENTION

1. Field of the Invention

The present invention relates to liquid copolymers of mercaptan-terminated polymers such as polysulfides and epoxy-terminated polymers such as epoxy resins which can be stored as prepolymers before final curing to form solid products.

2. Description of the Prior Art

The production of resins by coreacting polysulfides with polyepoxides in the presence of a catalyst is well known. The reaction between the mercaptan groups of the polysulfide and the oxirane groups of the polyepoxide proceeds easily and is the basis of U.S. Pat. No. 2,789,958, which describes the production of resinous reaction products of polyepoxides and polysulfides and methods of making them. All but one of the examples given in the U.S. Pat. No. 2,789,958 describe the reaction between liquid polysulfides and so-called polyepoxide curing agents in the presence of amine catalysts. The cured products were hard, tough, sometimes rubbery materials. In the other example, the polysulfide polymer was reacted with the polyepoxide curing agents, in the absence of amine catalyst, at 70° C. for six hours and at 25° C. for two days. The product was a tough rubbery polymer.

The invention described in the U.S. Pat. No. 2,789,958 formed the basis for the use of liquid polysulfide polymers as flexibilizers for polyepoxy resins. In these systems the liquid polysulfide polymer is mechanically mixed into the polyepoxide resin together with a catalyst, usually a tertiary amine. The resulting products are tough, impact resistant solids, which if necessary adhere to a wide range of substrates.

The products of such processes have been used in the production of adhesives, coatings, electronic encapsulation systems and moldings.

No. GB-A-787 022 describes self-hardening resins made by mixing liquid or semisolid epoxide resins and liquid aliphatic saturated polythiopolymercaptans. These resins generally cure to a hard rubbery state within 24 hours or in a few cases 48 hours.

Despite their undoubted success as tough, chemically resistant coatings and adhesives, current LP/epoxy systems suffer from the limitations of a mercaptan odour emanating from the polysulfide component, which persists until the system begins to cure.

U.S. Pat. No. 3,101,326 discloses the reaction of a polysulfide with styrene oxide to reduce or eliminate the mercaptan odor. The product can be used to flexibilize epoxy resins.

SUMMARY OF THE INVENTION

According to the present invention there is provided a curable liquid polymer composition having a stable viscosity prior to curing, said composition containing a copolymer formed by an addition reaction between epoxy groups of an epoxy-terminated polymer having at least two epoxy groups per molecule and mercaptan groups of a mercaptan-terminated polymer having at least two mercaptan groups per molecule, one of said polymers being in stoichiometric excess whereby the copolymer has free epoxy or mercaptan groups.

In compositions having free epoxy groups, the odor of mercaptan is elminated.

The invention also provides a process for producing a composition as defined above which comprises reacting an epoxy-terminated polymer having at least two epoxy groups per molecule with a mercaptan-terminated polymer having at least two mercaptan groups per molecule, one of said polymers being in stoichiometric excess whereby the final product has free epoxy or mercaptan groups. The composition thus produced can be stored for subsequent curing with a curing agent reactive with said epoxy or mercaptan groups to give a solid copolymer.

The basis of this invention is that stable liquid prepolymers can be formed by a direct, uncatalyzed, reaction between liquid polymers with terminal or pendant mercaptan groups and solid or liquid polymers with terminal oxirane groups. The oxirane groups are in stoichiometric excess over the mercaptan groups or vice versa. This ensures that the amount of chain extension is limited thus keeping the viscosity increase resulting from the coupling of the two polymers to a minimum.

The products of the invention represent a new class of liquid polymer composition containing block copolymers, with alternating blocks of polysulfide and polyepoxide and with either oxirane or mercaptan end groups depending on the relative proportions of the two components in the initial reaction mixture. These liquid copolymers can be stored until required for final curing, when the residual reactive groups in the copolymer can participate in further chain extension reaction, using conventional epoxide or polysulphide curing agents, to produce a range of solid polymers with useful commercial applications.

The products of the invention preferably have a viscosity not higher than 100 pas, more preferably less than 60 pas, at 25° C. Their molecular weight is usually in the range of 1600 to 5000, preferably not more than 3000.

The reaction of the invention is preferably carried out at temperatures from 10° to 120° C., it can conveniently be carried out at relatively low temperatures such as 10°–50° C., and typically at 20° C. Increased reaction rates and lower viscosity can be obtained using relatively higher temperatures such as 60° C. The reaction can be carried out by simple admixture of the two components in the desired proportions, the mixture then being allowed to stand until the reaction is complete. The reaction mixture may include a solvent.

The composition of the invention will normally include as a major component block copolymers of the epoxy- and mercaptan-terminated polymers.

The ideal structure for the block copolymer would be an ABA structure comprising a polysulfide molecule capped with two polyepoxide molecules:

copolymer formed by an addition reaction between epoxy groups of an epoxy-terminated polymer having or a polyepoxide molecule capped with two polysulfide molecules

Typical adducts of this type would have molecular weights of about 1700. Typical polymer composition of the invention will also contain the excess polymer in unreacted form.

Less desirable structures for the copolymer would be:

and

HS—POLYSULFIDE—POLYEPOXY—POLYSULFIDE—POLYEPOXY—POLYSULFIDE—SH and higher analogues, with molecular weights of 3000 or more.

The viscosity of the latter analogs would be greater than these achieved with the ideal structures. The copolymers of the invention do not necessarily have exclusively the ideal structures, but preferred formulations, in accordance with the invention, favor a predominance of the ideal structures in the final product. The invention is not limited to the use of difunctional polysulfide polymers and difunctional polyepoxide polymers, that is polymers with two functional groups per polymer molecule. Polymers with a functionality greater than two can also be used to produce the liquid products. However polymers with functionality much greater than two would produce solid products or liquid products with unmanageably high viscosity.

The copolymers produced by the chemistry described in this invention are referred to as adducts. There are basically two types:

(i) Those formed from a stoichiometric excess of oxirane groups over mercaptan groups. The resulting liquid polymer products have no residual mercaptan groups, have no mercaptan odor and have free oxirane groups, which can be opened in chain extension/cross linking reactions using the catalysts commonly used in epoxy resin technology. The products in (i) are known as the excess epoxy adducts.

(ii) Those formed from a stoichiometric excess of mercaptan groups over oxirane groups. The resulting liquid polymer products have no residual oxirane groups, might retain a mercaptan odor and have free mercaptan groups, which can be reacted using curing agents commonly used in polysulfide polymer technology, for example manganese dioxide. The products in (ii) are known as excess mercaptan adducts.

The composition containing excess epoxy adducts can be used in all the technologies where currently epoxy resins or polysulfide plus epoxy resins are used. The formulation may be simple, where cure of the adduct alone is effected by the addition of a catalyst such as a tertiary amine, or it might be more complex, with the addition to the adduct of particulate fillers, chopped fibers, plasticizers, pigments etc. preceding the cure with the catalyst. The excess epoxy adduct may also be blended with other liquid polymers, such as polyepoxide polymers, polysulfide polymers, polybutadiene polymers, polybutadiene-coacrylonitrile polymers. Where the polymers have suitable reactive groups such as carboxylic acid, amine, mercaptan or hydroxyl, co-reaction with the oxirane groups is feasible. With or without co-reaction the adduct would be expected to enhance a property or properties of the second polymer, for example, tear strength, adhesion or chemical resistance. The technologies in which the liquid adduct can be used include adhesives, coatings, primers, electronic encapsulation, sealing compounds, mouldings and the manufacture of composites.

The excess mercaptan adduct can be used in technologies where mercaptan polysulfide polymers are currently used. Cure and cross linking can be effected through the use of agents capable of oxidizing mercaptan groups into disulfide linkages, such as inorganic peroxides, dichromates and permanganates or organic hydroperoxides. It is customary, although not essential, to form compounds of liquid polysulfide polymers with particulate fillers, plasticizers, thixotropic agents, adhesion promoters etc. Similar compounding principles would apply to the excess mercaptan adduct. The excess mercaptan adduct may also be blended with other liquid polymers such as polysulfide polymers and polyepoxide polymers where the mercaptan groups in the adduct would co-react with the mercaptan group and oxirane groups respectively of the other polymers. The excess mercaptan group adduct could also be blended with high molecular weight solid polysulfide polymers, which also contain free mercaptan groups for co-reaction. The addition of the adduct to any one of these polymers would be expected to enhance one or more properties in the cured product, such as tear strength, adhesion, elastic recovery and abrasion resistance.

To understand the theory of adduct manufacture certain terms associated with epoxy resins and liquid polysulfide polymers must be explained.

EPOXY GROUP CONTENT

This term is used herein to mean the number of molecules of epoxide groups in 1 kilogram of epoxy-terminated polymer.

Units=moles/Kg.

LP MERCAPTAN CONTENT

The -SH mercaptan content of liquid mercaptan-terminated polymers is usually quoted as a percentage. For the co-reaction with Epoxy-terminated polymers it is more useful to express the mercaptan content in the same units as the Epoxy Group Content i.e. moles/Kg.

e.g. LP-33 (described in more detail below) has a mercaptan content of 5.76% i.e. in 1 Kg of LP-33 there is 0.0576 Kg of mercaptan groups.

The number of moles of mercaptan per Kg=

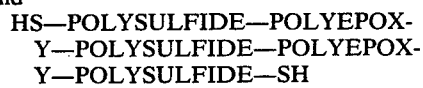

The molecular weight of the Mercaptan group = 0.033 Kg. Therefore the number of moles of —SH in 1 Kg of LP-33 = 0.0576/0.033 = 1.75 moles/Kg i.e. Mercaptan content of LP-33 = 1.75 moles/Kg.

In the case of the excess epoxy adduct, a 1:1 weight ratio has been found to give satisfactory results, and a polyepoxide/polysulfide weight ratio of 2:1 has been found to be particularly advantageous from the point of view of low viscosity. Generally, the proportions are preferably selected so that the molar ratio of epoxy groups to mercaptan groups is in a range from 2:1 to 7.5:1, more preferably 2:1 to 5:1.

In the case of the excess polysulfide adduct, lower molar excesses of mercaptan groups are generally preferred, typically in the range 1.5:1 to 3:1. In terms of polysulfide/polyepoxide weight ratios, the preferred range is from 3:1 to 6:1.

The mercaptan-terminated polymers usually have an average molecular weight of 500 to 1200, preferably not more than 2000. The viscosity is preferably 0.5 to 2.5 Pas and the mercaptan content is preferably 1.5 to 2.5 mole/kg.

Mercaptan-terminated polysulfide polymers which are particularly suitable for the purposes of the invention are characterterized by the fact that they have recurring polysulfide linkage between organic radicals having at least two primary carbon atoms which are connected to disulfide linkages. Typical examples of disulfide polymers are those corresponding to the general formula:

$$HS-(-RSS-)_x-RSH$$

in which each R is an organic polyvalent radical, preferably predominantly divalent alkylene oxahydrocarbon or thiahydrocarbon radicals, examples of which are given in U.S. Pat. No. 2,789,958, and X is a number greater than one and may vary from a relatively small number in the case of liquid polymers having a molecular weight of about 500 to 12000, e.g. 3 to 100 where R is —(C—$CH_2CH_2$—)—, to a relatively large number in the case of solid polymers which may have a molecular weight of about 100,000 to several million. The low molecular weight polysulfide polymers e.g. 500 to 12000, are normally liquids at 25° C. and are preferably formed by the reaction of an organic dihalide with a backbone corresponding to R with an inorganic polysulfide e.g., $Na_2S_y$, y usually being greater than two. Solid organic polysulfide polymers are produced thereby which may be split according to the method of U.S. Pat. No. 2,466,963 to provide liquid polythiol polymers.

Preferred liquid polysulfides used in the preparation of the liquid products of the invention are those manufactured by Morton Thiokol Incorporated and known as LP's. Three grades in particular will be exemplified:

TABLE 1

| | Av. Molecular Weight | Viscosity at 25° C. (Pas) | Mercaptan Content (Moles/Kg) | % Branching in Polymer (Moles/Kg) |
|---|---|---|---|---|
| LP-3 | 1000 | 0.94–1.44 | 1.78–2.33 | 2.0 |
| LP-33 | 1000 | 1.5–2.0 | 1.51–1.97 | 0.5 |
| ZL-1400C | 1000 | 0.95–1.85 | 1.88–2.15 | 0 |

In the manufacture of Excess Epoxy Adducts, the use of LP-33 produces adducts with lower and more stable viscosities than those based on LP-3.

This is probably due to the lower percentage of trifunctional component present in the LP-33 (cf 0.5% in LP-33 and 2% in LP-3). Trifunctionality provides even more sites for chain extension and polymer cross linking by the mercaptan-epoxy co-reaction. Cross linking and chain extension leads to higher adduct molecular weights and therefore higher viscosities.

Further research has shown that the use of a liquid polysulfide with no trifunctionality would produce adducts with viscosities that are lower and more stable than those based on LP-3 and LP-33. ZL 1400C is one suitable "zero cross-link" form of LP.

As polyepoxy polymers for the preparation of the liquid polymer products of the invention, various commercially available epoxy resins can be used. The polyepoxide polymers used are usually liquid, although the chemical principles pertain to solid polyepoxide polymers also.

The preferred polymers have an average molecular weight of 250 to 600. The preferred epoxy group content is in the range from 2 to 6 mole/kg. When a liquid polymer is used its viscosity is preferably 0.5 to 20 Pas. Liquid epoxy resins formed from epichlorohydrin and bisphenol A and sold under the trade names "Epikote" and "Araldite" are particularly suitable. The properties of some of these epoxides are as follows:

TABLE 2

| | Epoxy Molar Mass. g. | Viscosity 25° C. (Pas) | Average Epoxide Content Moles/kg |
|---|---|---|---|
| Shell Epikote 828 | 182–194 | 9.0–14.0 | 5.32 |
| Shell Epikote 815 | 180–200 | 0.7–1.1 | 5.28 |
| Shell Epikote 817 | 210–240 | 2.0–2.5 | 4.47 |
| Shell Epikote 216 | 190–210 | 5.0–6.0 | 5.01 |
| Shell Epikote 816 | 195–215 | 1.5–2.1 | 4.89 |
| Shell Epikote 213 | 190–210 | 0.7–1.1 | 5.01 |
| Ciba-Geigy Araldite MY778 | 188–200 | 0.8–1.5 | 5.15 |
| Ciba-Geigy Araldite MY750 | 187–194 | 8.0–16.0 | 5.25 |
| Ciba-Geigy Araldite XD4955 | 172–185 | 4.5–6.5 | 5.60 |

(Epikote and Araldita are Registered Trade Marks).

Heavy duty, industrial epoxy coatings are based on solid epoxy resins. These systems are supplied with the epoxy resin dissolved in solvent. Solid epoxy coatings are said to provide superior corrosion and environmental resistance to the liquid Epikote 828 type coatings albeit with some loss of cured coating flexibility. The present invention envisages the use of such solid epoxy resins in forming stable liquid adducts.

One suitable type of solid epoxy resin which may be used is Shell Epikote 1001, which has an epoxide content of 2:1 mole/kg.

It is also possible to use low molecular weight polyfunctional glycidyl compounds. These are often referred to as reactive diluents by manufacturers of polyepoxide polymers. An example is Anchor Chemicals Heloxy 68, which has an epoxy molar mass of 135–155 g, a viscosity at 25° C. of 1–16 m Pas and an average epoxide content of 6.89 mole/kg. (Heloxy is a Registered Trade Mark).

The following examples are given to explain more fully the nature of the present invention, but are merely illustrative and are not to be construed as limiting the scope of the invention as defined by the claims.

EXAMPLE 1

200 grams of LP-33 were intimately mixed with 200 grams of Epikote 815. The mixture was allowed to stand at 25° C. and after one week it was noted that the mercaptan group concentration, as measured by standard analytical procedure, had fallen to zero, and the odor of LP-33 had disappeared. The ratio of Epikote 815 to LP-33 taken at the start represents a molar ratio of 3.0 to 1 of oxirane groups to mercaptan groups. The viscosity of the product adduct after two weeks was 34.9 Pas (at 25° C.). After six months storage at room temperature the viscosity was measured again and shown to be 34.5 Pas (at 25° C.). This low viscosity was found still to be maintained after 36 weeks. 100 grams of the product adduct were cured with 5 grams of the amine, tri-dimethylaminomethylphenol. The cure characteristics and the physical properties of the cured product were compared with those obtained using, freshly mixed, 50 grams of Epikote 815, 50 grams of LP-33 and 5 grams of the same amine curing agent.

The results, shown in Table 3, indicate that the cured adduct exhibits the toughness obtained with the LP-33/Epikote 815 control mix.

TABLE 3

| | Epikote 815 and LP-33 | |
|---|---|---|
| | Adduct | Control Mix |
| Gel time (mins.) | 60 | 30 |
| Cure exotherm (°C.) | 40 | 60 |
| Abrasion resistance[a] | 8.57 | 7.21 |
| Tensile strength (MPa) | 9.77 | 10.60 |
| Elongation to Break (%) | 15 | 25 |
| Impact Strength (lb in)[b] | 160+ | 160+ |
| Flexibility | OK | OK |
| Hardness (Shore D) | 59 | 63 |

[a]DuPont Abrader. Volume loss per 1000 revolutions.
[b]Falling weight. 160 lb in is the maximum figure obtainable.

EXAMPLE 2

200 grams of Epikote 817 were intimately mixed with 200 grams of LP-3. The mixture was kept at 40° C. and after 1 week the mercaptan level had fallen to zero and the odor of LP-3 had disappeared. The ratio of Epikote 817 to LP-3 taken at the start represents a molar ratio of 2.07 to 1 of oxirane groups to mercaptan groups. The same reaction mix was also kept at room temperature, when the mercaptan content fell to zero after three weeks. The viscosity of the adduct formed at room temperature was initially 91.1 Pas, after 8 weeks 83.9 Pas and after 6 months 82.1 Pas. There was little change from this figure after 36 weeks. It had no LP-3 odor. Viscosity was measured at 25° C. 100 grams of the product adduct were cured with 5 grams of the amine, tri-dimethylaminomethylphenol. The cure characteristics were compared with those obtained using, freshly mixed, 50 grams of Epikote 817, 50 grams of LP-33 and 5 grams of the same amine curing agent. The results are shown in Table 4.

TABLE 4

| | Epikote 817 and LP-3 | |
|---|---|---|
| | Adduct | Control Mix |
| Gel time (mins) | 40 | 30 |
| Cure exotherm (°C.) | 25 | 50 |
| Abrasion resistance | 8.7 | 4.7 |
| Tensile strength (MPa) | 8.32 | 10.05 |
| Elongation to break (%) | 55 | 95 |
| Impact strength (lb in) | 160+ | 160+ |
| Flexibitiy | OK | OK |
| Hardness (Shore D) | 56 | 45 |

EXAMPLE 3

200 grams of Epikote 213 were intimately mixed with 200 grams of LP-3. The mixture was stood at room temperature and after two weeks the mercaptan content had fallen to zero and the smell of LP-3 had disappeared. The ratio of Epikote 213 to LP-3 taken at the start represents a molar ratio of 2.32 to 1 of oxirane groups to mercaptan groups. The viscosity of the adduct when first formed was 45.6 Pas (25° C.). After 4 months it was 41.3 Pas (25° C.).

The adduct of Epikote 213 and LP-3 was cured with different levels of tri-dimethylaminomethylphenol. The results are shown in Table 5.

TABLE 5

| Weight of curative (grams) | 5 | 10 | 20 |
|---|---|---|---|
| Weight of adduct (grams) | 100 | 100 | 100 |
| Work life (hours) | 1.5 | 1.0 | 0.5 |
| Cure exotherm (°C.) | 27 | 30 | 34 |
| Time to solid (hours) | 6 | 3 | 1 |
| Hardness (3 days. Shore D) | 35 | 45 | 65 |

EXAMPLE 4

200 grams of Epikote 816 were intimately mixed with 200 grams of LP-33. The mixture was kept at room temperature and after 16 days the mercaptan content had fallen to zero and the odor of LP-33 had disappeared.

The ratio of Epikote 816 to LP-33 taken at the start represents a molar ratio of 2.8 to 1 of oxirane groups to mercaptan groups. The viscosity of the adduct when first formed was 31.1 Pas (25° C.). After 3 months it was 33.0 Pas (25° C.).

EXAMPLE 5

200 grams of Araldite 4955 were intimately mixed with 200 grams of LP-33. The mixture was stood at 40° C. After one week the mercaptan content had fallen to zero and the odor of LP-33 had disappeared. The ratio of Araldite 4955 to LP-3 taken at the start represent a molar of 3.2 to 1 of oxirane groups to mercaptan groups. The viscosity of the adduct when first formed was 46.9 Pas (25° C.). After six weeks it was 47.1 Pas (25° C.).

EXAMPLE 6

250 grams of Epikote 828 were mixed with 1000 grams of LP-3. The mixture was kept at room temperature and after 24 weeks the oxirane concentration had fallen to zero. The ratio of LP-3 to Epikote 828 taken at the start represents a molar ratio of 1.62 to 1 of mercaptan groups to oxirane groups. The viscosity of the product was 66.0 Pas (25° C.).

100 grams of the product were mixed with 34.5 grams of a paste consisting of 10 grams of active manganese dioxide, 12.5 grams of a liquid chlorinated paraffin and 0.5 grams of tetra methylthiuram disulfide. The mix cured to an elastomeric solid 90 minutes.

EXAMPLE 7

The following Excess Epoxy Adducts were manufactured by mixing the liquid polysulfide component with the epoxy resin at 1:1 by weight ratio:
Epikote 213+LP-3
Epikote 213+LP-33
Epikote 816+LP-3
Epikote 816+LP-33

0.4 Kg batches of each system were manufactured and stored at both room temperature and 40° C. The mercaptan content viscosity and epoxide content of each batch being monitored on a weekly basis over a 6 month storage period.

The following room temperature stored Excess Epoxy Adducts were found to have stable, low viscosities at the end of the 6 month storage period:
Epikote 213+LP-3 (c.40 Pas)
Epikote 213+LP-33 (c.30 Pas)
Epikote 816+LP-3 (c.50 Pas)
Epikote 816+LP-33 (c.30 Pas)

Of the 40° C. stored Adducts, the following exhibited viscosity stability for 17 to 20 weeks:
Epikote 816+LP-3 (c.70 Pas)
Epikote 816+LP-33 (c.40 Pas)

The Epikote 213+LP-3 and LP-33 40° C. stored Adducts exhibited viscosity stability for 10 to 12 weeks, remaining well below 50 Pas in each case.

EXAMPLE 8

The Modification of Epikote 828 With Epoxy Diluents to Produce Stable Low Viscosity Excess Epoxy Adducts The following diluents were used:

1. Anchor Chemicals Heloxy MK 116

A mono-functional high molecular weight aliphatic glycidyl ether diluent was mixed with the Epikote 828 in the following proportions

|  | Parts by wt. |
|---|---|
| Epikote 828 | 100 |
| Heloxy MK 116 | 20 |

2. Anchor Chemicals Heloxy WC 68

A difunctional reactive glycidyl ether, Heloxy 68 is a technical grade of neopentyl glycol diglycidyl ether which has low volatility.

The diluent was mixed with the Epikote 828 in the following proportions:

|  | Parts by wt. |
|---|---|
| Epikote 828 | 100 |
| Heloxy WC 68 | 39 |

Viscosity of modified Epoxy resin = 1 Pas

The diluent modified Epikote 828 systems were mixed with the liquid polysulfide component at a 1:1 by weight ratio to form the following Excess Epoxy Adducts:
Epikote 828+Heloxy 116+LP-3
Epikote 828+Heloxy 116+LP-33
Epikote 828+Heloxy WC 68+LP-33

These adducts were stored at room temperature and 40° C. The following results were obtained.

1. The Heloxy 116 samples were stored for up to 17 weeks and exhibited viscosities in the 35 to 45 Pas region for the EPikote 828+LP-3 variety and 25 to 30 Pas for the Epikote 828+LP-33 variety.
2. The Epikote 828+Heloxy WC 68+LP-33 adduct samples were both stable after 10 weeks storage, with adduct viscosity very low at 15 to 25 Pas.
3. The Heloxy 116 samples required 4 weeks storage to form adducts while the Heloxy WC 68 samples formed adducts in 2 to 3 weeks.
4. Neither Heloxy modified Epikote 828+LP adducts have had at the time of filing, sufficient storage time for a full assessment to be made of their viscosity stability.

EXAMPLE 9

The Use of a "Zero Cross-Link" LP to Produce Stable Low Viscosity Excess Epoxy Adducts The zero percentage cross-link LP used in this example was ZL-1400C. The analytical data obtained from Morton Thiokol Inc. in the U.S.A. on ZL-1400C is outlined below:

| Sample | %-SH | Viscosity at 25° C. |
|---|---|---|
| ZL-1400C | 6.21 | 1.82 Pas |

The following Excess Epoxy Adducts were manufactured by mixing the ZL-1400C with the epoxy resin component at a 1:1 by weight mix ratio:
Epikote 828+0% Cross-link LP (ZL-1400C)
MY 750+0% Cross-link LP (ZL-1400C)
XD 4955+0% Cross-link LP (ZL-1400C)
MY 778+0% Cross-link LP (ZL-1400C)

An "in house" diluent modified Epikote 828 was also mixed at a 1:1 ratio with the ZL-1400C to produce the Excess Epoxy Adduct:
Epikote 828+Heloxy WC 68+0% Cross-link LP (ZL-1400C)

Samples were stored at room temperature and at 40° C. for up to 6 months.

Table 6 illustrates clearly the effect of mercaptan polyfunctionality on adduct viscosity and overall viscosity stability for the room temperature stored samples:

TABLE 6

| ADDUCT | % Cross-Link Component % | Average Adduct Viscosity (Pas) | Period of Adduct viscosity Stability (weeks) (R.T.) |
|---|---|---|---|
| Epikote 828 + 0% Cross-link LP (ZL-1400 C) | 0 | 60-65 | >21 |
| Epikote 828 + LP-33 | 0.5 | 75-80 | 22, gelled by 32 wks |
| Epikote 828 + LP-3 | 2 | >90 | No stability |
| MY 778 + 0% Cross-link LP (ZL-1400° C.) | 0 | 30 | >19 |
| MY 778 + LP-33 | 0.5 | 35-40 | >13 |
| MY 778 + LP-3 | 2 | 45 | >6 |

TABLE 6-continued

| ADDUCT | % Cross-Link Component % | Average Adduct Viscosity (Pas) | Period of Adduct viscosity Stability (weeks) (R.T.) |
|---|---|---|---|
| MY 750 — 0% Cross-link LP (ZL-1400° C.) | 0 | 60–70 | >19 |
| MY 750 + LP-33 | 0.5 | 70 | >5 |
| XD 4955 + 0% Cross-link LP (ZL-1400° C.) | 0 | 46–50 | 18 |
| XD 4955 + LP-33 | 0.5 | >50 | No stability |

The results of the evaluation of the use of zero cross link polysulfide in adduct formation leads to the following conclusion 1. The use of a zero-crosslink liquid polysulfide produces Excess Epoxy Adducts with lower and more stable viscosities than those manufactured from LP-3 and LP-33.
2. Adduct viscosity and viscosity stability is governed by the polysulfide component in the following manner:

DECREASING % TRIFUNCTIONAL COMPONENT →

LP-3    LP-33    ZL-1400° C.    →
DECREASING ADDUCT VISCOSITY
IMPROVED VISCOSITY STABILITY

EXAMPLE 10

A 1:0.5 weight mix ratio adduct of Epikote 828 and LP-33 was manufactured in 150 kg and 50 kg batch sizes to determine whether the properties associated with the small-scale adduct manufacture of Examples 1 to 9 are similarly applicable to larger production size quantities.

The bulk adduct mixes were manufactured by simple admixing of the LP and epoxy components in steel drums. The bulk mixes were manufactured and stored at room temperature.

0.4 and 5 kg samples of the same adduct were produced for comparison purposes.

The bulk adduct manufacture was found to be accompanied by a reaction exotherm which raised the temperature of the mix from 21° C. to 39° C., an increase of 18° C. This exotherm was present in both the 50 kg and 150 kg batches was not detected in the 0.4 kg of 5 kg samples.

The rates of adduct formation for the four batch sizes are set out in Table 7 which shows that the larger the adduct batch size, the more rapid the rate of adduct formation.

TABLE 7

| Batch Size (kg) | Time to Adduct formation at Room Temp. (Days) |
|---|---|
| 150 | 4–6 |
| 50 | 8–10 |
| 5 | 14 |
| 0.4 | 21–28 |

It was also found that the bulk adducts exhibit a lower storage viscosity and a superior viscosity stability when compared to the smaller 0.4 kg batch sample. Table 8 illustrates these points.

TABLE 8

| STORAGE PERIOD at 20–25° C. WEEKS | SAMPLE VISCOSITY AT 20–25° C. (Pas) | | |
|---|---|---|---|
| | 150 Kg Sample | 50 Kg Sample | 0.4 Kg sample |
| 0 | 5.8 | 6.8 | 4.0 |
| 1 | 54.4 | 62.2 | 35.0 |
| 3 | 46.0 | 47.3 | 44.0 |
| 6 | 49.1 | 50.6 | 36.0 |
| 10 | 40.8 | 42.0 | 45.0 |
| 12 | 50.6 | 46.2 | 50.6 |
| 14 | 38.8 | 34.0 | 53.0 |
| 17 | 35.9 | 36.0 | 53.0 |
| 20 | 32.6 | 35.0 | |
| 23 | 46.1 | 45.7 | |
| 26 | 43.0 | 46.5 | |
| 39 | 38.0 | 36.0 | |

EXAMPLE 11

A 1:0.25 by weight mix ratio of Epikote 1001 and LP-33 was prepared.

The epoxide content of this adduct can be calculated as follows:

Epikote 1001: Epoxide content = 2.1 moles $Kg^{-1}$

LP-33: Mercaptan content = 1.75 moles $Kg^{-1}$

Therefore a 1:0.25 weight mix ratio of Epikote 1001 and LP-33 has in 1.25 Kg. of sample:

2.1 moles $Kg.^{-1}$ − 1.75/4 moles $Kg^{-1}$ = 1.66 moles of excess Epoxide.

In 1 Kg. of sample there is 1.66 moles/1.25 moles = 1.33 moles of excess Epoxide.

Thus, the epoxide content of a 1:0.25 Epikote 1001 + LP-33 Adduct = 1.33 moles $Kg^{-1}$ The solid Epikote 1001 was ground into a fine powder using a mortar and pestle.

50 grams of this powdered resin was weighed into a three necked round-bottomed flask and 12.5 grams of LP-33 added. Approximately 10 grams of Methyl-ethyl ketone was added as a solvent and the mixture stirred well using a mechanical stirrer. Heat was gradually applied via a heating mantle. When the temperature of the mix reached 60° C. the system became semi-solid. At 70° C. the mix was fluid and easily stirred.

The heating source was removed when the temperature of the mix reached 70° C. The temperature of the mix continued to rise peaking at 80° C. (this may be due to a reaction exotherm) and then cooled gradually to room temperature. Virtually all the solvent was removed during the heating process and as a result the room temperature mix was very viscous but definitely not solid. After three days standing at room temperature in the sealed round bottomed flask the mixture had lost its mercaptan odor. Infra-red analysis confirmed that there were no mercaptan groups present in the mix indicating that an adduct had been formed.

The adduct was subsequently used in the following high solids surface coating formulation

|  | Pbw |
| --- | --- |
| 1:0.25 by weight Epikote 1001 + LP-33 adduct | 30 |
| K-54 Curative | 3 |
| Methyl-ethyl-ketone | 5 |

The coating was doctor-blade applied onto aluminum and shot blasted mild steel plates.

The formulation had the following cure characteristics:

Pot life (38 g cup size) = 1½ hours
Tack free time as a thin film on steel = 2-4 hours.

EXAMPLE 12

A 1:0.25 by weight mix ratio adduct of Epikote 1001 and ZL-1400C was formulated into a white coloured 79% solids content solvent-based coating and spray applied onto steel Q-Panels and shot blasted mild steel substrates. The cured coatings resistance to cold salt spray, UV exposure and heat ageing was evaluated.

| 1:0.25 Epikote 1001 + ZL-1400C | 100 |
| --- | --- |
| Titanium dioxide | 25 |
| Beetle 640 flow promoter | 20 |
| Ancamine 1608 curative | 4 |
| Methy Ethyl Ketone:Xylene (100:50) | 40 |

RESULTS

*Coating Appearance = Very high gloss finish.
Average Coating Thickness = 150

1. Cross-Hatch Adhesion BS-3900 Part E6 Cross-Cut Test

| Initial | After 240 hrs. Salt Spray Exposure | After 480 hrs. Salt Spray Exposure | 240 hrs. UV Exposure at 70° C. | After 120 hrs. Heat Aging at 70° C. |
| --- | --- | --- | --- | --- |
| 0 Excellent | 0 Excellent | 0 Excellent | 0 Excellent | 0 Excellent |

2. Mar Resistance ASTM D-3363 Film Hardness by Pencil Test

| Initial | After 240 hrs. Salt Spray Exposure | After 480 hrs. Salt Spray Exposure | After 240 hrs. UV Exposure at 70° C. | After 120 hrs. Heat Aging at 70° C. |
| --- | --- | --- | --- | --- |
| B | HB | H | 7H | 6H |

3. Reverse Impact Resistance (Falling Weight Method)

| Initial | After 240 hrs. Salt Spray | After 480 hrs. Salt Spray | After 240 hrs. UV at 70° C. | After 120 hrs. 70° C. Heat Aging |
| --- | --- | --- | --- | --- |
| >18 Joules | 13.6 Joules | 2.3 Joules | 4.5 Joules | <2.3 Joules |

4. Elongation of Coating With Conical Mandrel Apparatus

Test Method ASTM D-522
Coating elongation = 30%

5. Corrosion Resistance BS-3900 Part F4

There was no evidence of corrosion spread, paint film delamination or blistering after 240 hours continuous cold salt spray exposure.

EXAMPLE 13

An epoxy coating composition was prepared using an Epikote 828/LP-33 adduct as an additive. The formulation was as follows:

|  | Parts by Weight |
| --- | --- |
| Epikote 1001 | 100 |
| (1:0.5 Epikote 828 + LP-33) Resin | 25 |
| Titanium dioxide | 155 |
| Beetle 640 | 20 |
| Ancamine 1608 | 11 |
| Methyl ethyl ketone:Xylene (100:50) | 83 |

Cured Coating Test Results

Coating appearance: High Gloss Finish
Average Coating Thickness: 500–800 μm

1. Cross-Hatch Adhesion BS-3900 Part E6 Cross-cut test. Coatings on steel Q Panels.

| Initial | After 240 hrs. Salt Spray | After 480 hrs. Salt Spray at 70° C. | After 240 hrs. UV Exposure | After 120 hrs. Heat Aging at 70° C. |
| --- | --- | --- | --- | --- |
| 0 (Excellent) | 0 | 0 | 0 | 0 |

2. Mar Resistance ASTM D-3363 Film Hardness by Pencil Test

| Initial | After 240 hrs. Salt Spray | After 480 hrs. Salt Spray at 70° C. | After 240 hrs. UV Exposure | After 120 hrs. Heat Aging at 70° C. |
| --- | --- | --- | --- | --- |
| B | H | H | 7H | H |

Reverse Impact Resistance

| Initial | After 240 hrs. Salt Spray | After 480 hrs. Salt Spray | After 240 hrs. UV at 70° C. | After 120 hrs. 70° C. Heat Aging |
| --- | --- | --- | --- | --- |
| >18 Joules | 18 Joules | 18 Joules | 2.3 Joules | 2.3 Joules |

4. Elongation of Coating With Conical Mandrel Apparatus

ASTM D-522 Test Method
Coating Elongation = 13.2%

5. Corrosion Resistance

BS-3900 Part F 4

There was no evidence of corrosion spread, paint film delamination or blistering after 480 hours continuous cold salt spray exposure.

EXAMPLE 14

A 1:0.25 by weight mix ratio adduct of Epikote 1001 and LP-33 was evaluated as a primer system for a two part polysulfide sealant on a concrete substrate. The adduct based primer was applied as a 50% solid content solution onto concrete (formulation outlined below) and the primer/sealant system tested according to BS 4254 for adhesion and cohesion in tension.

The primer was allowed to become tack free before the polysulfide sealant was applied.

TECHNICAL DETAILS

1. Primer Formulation

| | Parts by Weight |
|---|---|
| 1:0.25 Epikote 1001 + LP-33 Adduct | 100 |
| EDA Adduct 870 Curative* | 24 |
| Methyl-ethyl ketone | 124 |

Drying time of primer system on concrete = 30 minutes
*EDA Adduct 870 curing agent is a chemical adduct of a solid epoxy resin with ethylene diamine. The curative is manufactured by Anchor Chemical (UK) Limited.

2. Polysulfide Sealant System

The polysulfide sealant used in this evaluation was a two component manganese dioxide cured 35% polymer content sealant. The mix ratio by weight of Base:Curing Paste was 275:22.5.

The results of the BS-4254 tests are set out in Table 9.

TABLE 9

| Samples | Specification Limits | Results |
|---|---|---|
| Initial | 25 N–270 N 100 mm$^2$ Maximum failure at 150% Extension | 149 N 147 N NF |
| Water Imersion | 25 N–270 N 100$^2$ Maximum failure at 150% Extension | 131 N 129 N NF |
| Heat Aged | 25 N–270 N 100 mm$^2$ Maximum failure at 100% Extension | 134 N 132 N NF |

Note NF indicates no adhesive or cohesive failure.
INITIAL refers to the tensile stress at 150% strain on test specimens where the sealant has been allowed to cure for 7 days at 25 ± 2° C. and 50 ± 5% r.h. prior to testing.
WATER IMMERSION refers to the tensile stress at 150% strain on test specimens which have been totally immersed in water for 7 days at 25 ± 20° C. subsequent to the INITIAL conditioning period
HEAT AGED refers to the tensile stress at 100% strain on test specimens which have been heat aged in a ventilated hot-air oven at 70 ± 2° C. for 7 days subsequent to the INITIAL conditioning period.

These results show that the adduct based primer has allowed the polysulfide sealant to meet the requirements of BS-4254 with regard to tensile adhesion to concrete.

EXAMPLE 15

The Effect of Altering the Epoxy/LP Mix Ratio on Adduct Viscosity

Epikote 828+Zero cross-link LP Excess Epoxy Adducts were manufactured from the following EPOXY:LP weight mix ratios:

| EPOXY:Zero Cross-link LP |
|---|
| 1:0.5 |
| 1:1 |
| 1:1.3 |
| 1:1.5 |

The adducts were stored at room temperature and their viscosities monitored on a weekly basis.

The 1:0.5 system formed an adduct after two weeks storage at room temperature. After three weeks storage the initial adduct viscosity had remained at circa 35 Pas.

The 1:1 mix formed an adduct after three weeks with viscosity peaking at 80 Pas at the time of adduct formation. Adduct viscosity then stabilised at circa 60 Pas for the remainder of the storage period of 21 weeks.

The 1:1.3 mix system formed an adduct after three weeks storage. Adduct viscosity peaked at 123 Pas at the point of formation but then stabilised at 80 Pas. This stability had been maintained after seven weeks storage.

The 1:1.5 mix system formed an adduct after four weeks storage with a viscosity of 114 Pas at the time of adduct formation. The resulting adduct showed no viscosity stability. After 14 weeks the adduct had virtually gelled.

These experiments lead to the following conclusions:
1. Decreasing the Zero cross-link LP component leads to a lower viscosity Excess Epoxy Adduct which exhibits improved storage stability.
2. The lower the Zero cross-link LP component the more rapid is the formation of an Excess Epoxy adduct.
3. Zero cross-link LP:Epoxy weight ratios greater than 1:1 produce unstable, high viscosity, Excess Epoxy Adducts.

The following 1:0.5 Epoxy:LP mix ratio adducts were also manufactured and stored both at room temperature and 40° C. Their viscosities being monitored on a weekly basis:
 1:0.5 Epikote 828+LP-33 (25–40 Pas)
 1:0.5 MY 778+LP-33 (20 Pas)
 1:0.5 MY 778+0% Cross-link LP (15 Pas)

It is significant to compare their initial behavior with those of their 1:1 mix ratio counterparts.
 1:1 Epikote 828+LP-33 (70–80 Pas)
 1:1 MY 778+LP-33 (30–40 Pas)
 1:1 MY 778+0% Cross-link LP (60 Pas)

Clearly the viscosities of the 1:0.5 Excess Epoxy Adducts are lower, at both room temperature and 40° C., than the 1:1 Excess Epoxy Adducts at the corresponding storage times.

For both LP-33 and the Zero Cross-link LP altering the Epoxy:LP mix ratio from 1:1 to 1:0.5 has the effect of:
(a) reducing the viscosity of the resulting Excess Epoxy Adduct.
(b) Producing Excess Epoxy Adducts with superior viscosity stability.

EXAMPLE 16

The Cure of Selected Low Viscosity Excess Epoxy Adducts

The following low viscosity Adducts were cured with 5 parts by weight of tridimethylaminomethylphenol curative to 100 parts of Adduct.
 Epikote 816+LP-3
 Epikote 816+LP-33
 Epikote 213+LP-3
 Epikote 213+LP-33
 Epikote 828+Heloxy 116+LP-3
 Epikote 828+Heloxy WC 68+LP-33

Table 10 compares the gel time and cure exotherm of these adducts with their conventional LP/Epoxy counterparts. The LP/Epoxy controls were cured with 10 parts by weight of tridimethylaminomethylphenol to 100 parts of epoxy component.

The results indicate that Adducts exhibit a longer gel time and lower cure exotherm than the LP/Epoxy controls.

TABLE 10

| | ADDUCT CURE | | | |
|---|---|---|---|---|
| | Adduct (a) | | Control (b) | |
| | Gel Time (mins) | Cure (°C.) Exotherm | Gel Time (mins) | Cure (°C.) Exotherm |
| Epikote 816 + LP-3 | 105 | 33 | 40 | 80 |
| Epikote 816 + LP-33 | 160 | 23 | 60 | 64 |
| Epikote 213 + LP-3 | 140 | 32 | 30 | 83 |
| Epikote 213 + LP-33 | 105 | 29 | 50 | 70 |
| Epikote 828 + Heloxy WC68 + LP 0% XL | 140 | 29 | 30(i) | 70(i) |
| Epikote 828 + Heloxy WC68 + LP-33 | | | 30(ii) | 60(ii) |
| Epikote 828 + Heloxy 116 + LP-3 | 90 | 27 | 30(i) | 70(i) |
| Epikote 828 + Heloxy 116 + LP-33 | 120 | 27 | 30(ii) | 60(ii) |

(i)Epikote 815 + LP-3, mixed in-situ.
(ii)Epikote 815 + LP-33, mixed in-situ.
(a) Adduct cured with 5 pbw of tridimethylaminomethylphenol to 100 parts of Adduct.
(b) Controls cured with 10 pbw of tridimethylaminomethylphenol to 100 parts of Epoxy component.

The Physical Properties of Cured Excess Epoxy Adducts

The Excess Epoxy Adducts cured with 5 parts by weight of trimethylaminomethylphenol were subsequently compared with their LP/Epoxy Controls for:
(a) Cured Hardness
(b) Abrasion Resistance
(c) Tensile Strength/Elongation at break
(d) Flexibility
(e) Impact/Adhesion The comparative results are shown in Tables 11 to 15.

Conclusions (a) Cured Hardness
Adduct hardness values are very similar to those of the Controls (b) Abrasion Resistance
The abrasion resistance values of the cured adducts are generally superior to those of the Controls.

(c) Tensile Strength/Elongation at break
Adduct tensile strength and elongation at break values are lower than those exhibited by their LP/Epoxy control counterparts. This may be due in part to the presence of voids in the Adduct test pieces. LP-33 based Adducts however tend to have tensile strength values which approach those of the LP-33 based controls.

(d) Flexibility
In general both Adducts and controls have comparable flexibility. Only the Epikote 816+LP-33 Adduct is more brittle than its LP/Epoxy counterpart (e) Impact/Adhesion
With the exception of the Epikote 816+LP-33 Adduct the impact/adhesion results for the controls and Adducts are very comparable.

TABLE 11

| HARDNESS RESULTS | | | |
|---|---|---|---|
| | Adduct Hardness Shore D | Control Hardness Shore D | |
| Epikote 816 + LP-3 | 55 | 54 | |
| Epikote 816 + LP-33 | 45 | 50 | |
| Epikote 213 + LP-3 | 47 | 50 | |
| Epikote 213 + LP-33 | 50 | 55 | |
| | | (i) | (ii) |
| Epikote 828 + Heloxy WC68 + LP-3 0% X-L | 58 | 45 | 56 |
| Epikote 828 + Heloxy WC68 + LP-33 | | 59 | 63 |
| Epikote 828 + Heloxy 116 + LP-3 | 55 | 45 | 56 |
| Epikote 828 + Heloxy 116 + LP-33 | 60 | 59 | 63 |

(i) Epikote 815 + LP Adduct from Example 1.
(ii) Epikote 815 + LP Control, mixed in situ.

TABLE 12

| ABRASION RESULTS DU-PONT ABRASION TESTER UNITS = VOLUME LOSS PER 1000 REVOLUTIONS | | | |
|---|---|---|---|
| | Adduct | Control | |
| Epikote 816 + LP-3 | 3.45 | 3.52 | |
| Epikote 816 + LP-33 | 3.92 | 4.2 | |
| Epikote 213 + LP-3 | 2.87 | 2.81 | |
| Epikote 213 + LP-33 | 2.36 | 2.41 | |
| | | (i) | (ii) |
| Epikote 828 + Heloxy WC68 + LP-3 0% X-L | 3.11 | 5.75 | 6.75 |
| Epikote 828 + Heloxy WC68 + LP-33 | | 8.57 | 7.21 |
| Epikote 828 + Heloxy 116 + LP-3 | 4.84 | 5.75 | 6.75 |
| Epikote 828 + Heloxy 116 + LP-33 | 4.88 | 8.57 | 7.21 |

(i) Epikote 815 + LP Adduct from Example 1.
(ii) Epikote 815 + LP Control from Example 1.

TABLE 13

| TENSILE RESULTS | | | | | |
|---|---|---|---|---|---|
| | ADDUCT | | Control | | |
| | Tensile Strength MPa | Elongation % | Tensile Strength MPa | | Elongation % | |
| Epikote 816 + LP-3 | 4.55 | 70-80 | 6.69 | | 140 | |
| Epikote 816 + LP-33 | 2.99 | 30-40 | 3.86 | | 100-110 | |
| Epikote 213 + LP-3 | 2.52 | 90-100 | 5.84 | | 160 | |
| Epikote 213 + LP-33 | 3.33 | 100-110 | 4.02 | | 120 | |
| | | | (i) | 35/37 (ii) | (i) | (ii) |
| Epikote 838 + Heloxy WC68 + LP-3 | 8.34 | 30-40 | 6.66 | 13.37 | 40-50 | 40-50 |
| Epikote 828 + Heloxy WC68 + LP-33 | * | | 10.79 | 15.15 | 10-20 | 20-30 |

TABLE 13-continued

| | TENSILE RESULTS | | | | | |
|---|---|---|---|---|---|---|
| | ADDUCT | | Control | | | |
| | Tensile Strength MPa | Elongation % | Tensile Strength MPa | | Elongation % | |
| Epikote 828 + Heloxy 116 + LP-3 | 4.49 | 70–80 | 6.66 | 13.37 | 40–50 | 40–50 |
| Epikote 828 + Heloxy 116 + LP-33 | 5.50 | 20 | 10.79 | 15.15 | 10–20 | 20–30 |

Test Conditions
Cross-head speed = 5 mm/min
Temperature = 22° C.
(i) Epikote 815 + LP Adduct from Example 1.
(ii) Epikote 815 + LP Control from Example 1.

TABLE 14

| | FLEXIBILITY RESULTS | | | |
|---|---|---|---|---|
| | ADDUCT Fold back on self | CONTROL Fold back on self | | |
| | | | (i) | (ii) |
| Epikote 816 + LP-3 | OK | OK | | |
| Epikote 816 + LP-33 | Splits | OK | | |
| Epikote 213 + LP-3 | OK | OK | | |
| Epikote 213 + LP-33 | OK | OK | | |
| Epikote 828 + Heloxy WC68 + LP-3 0% X-L | Slight splitting | OK | OK | |
| Epikote 828 + Heloxy WC68 + LP-33 | | Splits | Splits | |
| Epikote 828 + Heloxy 116 + LP-3 | OK | OK | OK | |
| Epikote 828 + Heloxy 116 + LP-33 | Slight splitting | Splits | Splits | |

(i) Epikote 815 + LP Adduct from Example 1
(ii) Epikote 815 + Control from Example 1

TABLE 15

| SAMPLE lbs in | 20 | 40 | 60 | 80 | 100 | 120 | 140 | 160 |
|---|---|---|---|---|---|---|---|---|
| Epikote 816 + LP-3 | | | | | | | | |
| Adduct | Loss of Adhesion | | | | | | | |
| Control | Loss of Adhesion | | | | | | | |
| Epikote 816 + LP-33 | | | | | | | | |
| Adduct | Loss of Adhesion | | Slight Splitting | | | Bad Splitting | | |
| Control | | | | | | | Slight loss Adhesion | |
| Epikote 213 + LP-3 | | | | | | | | |
| Adduct | | Loss of Adhesion & Splitting | | | | | | |
| Control | Loss of Adhesion | | Splitting | | | | | |
| Epikote 213 + LP-33 | | | | | | | | |
| Adduct | | Loss of Adhesion & Splitting | | | | | | |
| Control | | | | Slight Splitting | | Bad Splitting/ Cracking & Loss of Adhesion | | |
| Epikote 828 + Heloxy WC68 + LP-3 0.OX | | | | | | | | |
| Adduct | Loss of Adhesion | | | | | | | |
| Control (i) | | | | | | | | Loss of Adhesion Intact |
| Control (ii) | | | | | | | | Loss of Adhesion Intact |
| Epikote 828 + Heloxy WC68 + LP-33 | | | | | | | | |
| Adduct | — | | | | | | | |
| Control (i) | | | | | | | | Loss of Adhesion Intact |
| Control (ii) | | | | | | | | Loss of Adhesion Intact |
| Epikote 828 + Heloxy 116 + LP-33 | | | | | | | | |
| Adduct | Loss of Adhesion | | | | | | | |
| Control (i) | | | Loss of Adhesion | | | | | Intact |
| Control (ii) | | Loss of Adhesion | | | | | | Intact |

(i) Epikote 815 + LP Adduct from Example 1.
(ii) Epikote 815 + LP Control from Example 1.

EXAMPLE 17

The following curatives were evaluated with both the Excess Epoxy Adducts and their LP/Epoxy controls:
- Anchor 1608
- Ancamine 1768
- Ancamide 502
- Ancamine MCA
- Triethylene tetramine The chemical nature and level of each curative used to cure the Adducts and controls are described in Table 16 below:

TABLE 16

| Curative | Chemical Description | Viscosity at 25° C. | Parts by Wt. of Curative to 100 Parts of: (a) adduct | Parts by Wt. of Curative to 100 Parts of: (b) Epoxy in the Control |
|---|---|---|---|---|
| Anchor 1608 | Liquid aliphatic amine adduct | 36 | 12.5 | 25 |
| Ancamine 1768 | Activated liquid aliphatic amine | 3 | 10 | 20 |
| Ancamide 502 | Liquid Aliphatic amido amine | 3.5 | 25 | 50* |
| Ancamine MCA | Liquid Cycloaliphatic amine | 2.5 | 27.5 | 55 |
| Triethylene-tetramine | Liquid aliphatic amine | | 5 | 10 |

The objectives of curative study were:
1. To observe the miscibility of the curative with the resin during mixing.
2. To measure the gel time, tack free time and exotherm of each curative/resin system.
3. To measure the cured hardness of these systems.
4. To measure the volume swell of the cured products after immersion in water at room temperature and 60° C.

To date the following Adduct and corresponding control resins have been studied:
- Epikote 816+LP-3
- Epikote 816+LP-33
- Epikote 213+LP-3
- Epikote 213+LP-33

The results of the Curative study are given in Tables 17 to 28 and summarized below. Depending on the property required, recommendations are made on the selection of curing agents from the ones studied.

| 1:1 EPIKOTE 816 + LP-3 EXCESS EPOXY ADDUCT | |
|---|---|
| 1:1 EPIKOTE 816 + LP-3 PARAMETERS | RECOMMENDED CURATIVE |
| Optimum Adduct/Curative Miscibility | Anchor 1608 Ancamine MCA |
| Rapid Cure | Anchor 1608 Triethylene tetramine |
| Optimum Water Resistance | Ancamine 1768, Ancamide 502 and Triethylene tetramine at 60° C. immersion and Triethylene tetramine at 22° C. immersion |

| 1:1 EPIKOTE 816 + LP-33 EXCESS EPOXY ADDUCT | |
|---|---|
| PARAMETER | *RECOMMENDED CURATIVE |
| Optimum Adduct/Curative miscibility | Anchor 1608 |
| Rapid Cure | Anchor 1608 |
| Optimum Water Resistance | Triethylene Tetramine or Ancamine 1768 at 60° C. immersion Triethylene tetramine or Ancamine 1768 or Ancamine 50 at 22° C. |

| 1:1 EPIKOTE 213 + LP-3 EXCESS EPOXY ADDUCT | |
|---|---|
| PARAMETER | RECOMMENEDED CURATIVE |
| Optimum Adduct/ Curative miscibility | Anchor 1608 Ancamine MCA |
| Rapid Cure | Anchor 1608 |
| Optimum Water Resistance | Ancamide 502 or Triethylene tetramine at 60° C. immersion Ancamine 1768 at 22° C. immersion |

| 1:1 EPIKOTE 213 + LP-33 EXCESS EPOXY ADDUCT | |
|---|---|
| PARAMETER | RECOMMENEDED CURATIVE |
| Optimum Adduct/ Curative miscibility | Anchor 1608 Ancamide 502 |
| Rapid Cure | Anchor 1608 |
| Optimum Water Resistance | Triethylenetetramine at 60° C. immersion Ancamine 1768 at 22° C. immersion. |

TABLE 17

| | ADDUCT 1:1 EPIKOTE 816 + LP-3 | | | | CONTROL 1:1 EPIKOTE 816 + LP-3 | | | |
|---|---|---|---|---|---|---|---|---|
| CURATIVE Type | WORK LIFE Hours | TACK FREE TIME Hours | EXO-THERM °C. | CURED HARDNESS Shore | WORK LIFE Hours | TACK FREE TIME Hours | EXOTHERM °C. | CURED HARDNESS Shore |
| Anchor 1608 | 2 | Overnight | 34 | 63A | 0.5 | 0.66 | >110 | 31D |
| Ancamine 1768 | Overnight | 22 | 31 | 44A | 1 | 7 | 68 | 53A |
| Ancamide 502 | Overnight | 36–48 | 27 | 44A | 1 | 7 | 68 | 50A |
| Ancamine MCA | Overnight | 36–48 | 27 | 17A | 7 | Overnight | 32 | 16A |
| Triethylene Tetramine | 3.5 | Overnight | 30 | 20D | 2.33 | 3.2 | 65 | 21D |

TABLE 18

1:1 EPIKOTE 816 + LP-3 ADDUCT

| | ROOM TEMPERATURE IMMERSION | | | 60° C. IMMERSION | | |
|---|---|---|---|---|---|---|
| CURATIVE Type | INITIAL CURED HARDNESS Shore | HARDNESS AFTER 1 MONTH'S WATER IMMERSION Shore | VOLUME SWELL % | INITIAL CURED HARDNESS Shore | HARDNESS AFTER 1 MONTH'S WATER IMMERSION Shore | VOLUME SWELL % |
| Anchor 1608 | 63A | 13D | 4.5 | 63A | 12D | 20.4 |
| Ancamine 1768 | 44A | 19D | 1.7 | 44A | 15D | 2.4 |
| Ancamide 502 | 44A | 40A | 3.3 | 44A | 44A | 7.3 |
| Ancamine MCA | 17A | Degraded after 1 week | — | 17A | Degraded after 1 week | — |
| Triethylene Tetramine | 20D | 60A | 1.5 | 20D | 62A | 2.7 |

TABLE 19

1:1 EPIKOTE 816 + LP-3 CONTROL

| | ROOM TEMPERATURE IMMERSION | | | 60° C. IMMERSION | | |
|---|---|---|---|---|---|---|
| CURATIVE Type | INITIAL CURED HARDNESS Shore | HARDNESS AFTER 1 MONTHS'S WATER IMMERSION Shore | VOLUME SWELL % | INITIAL CURED HARDNESS Shore | HARDNESS AFTER 1 MONTH'S WATER IMMERSION Shore | VOLUME SWELL % |
| Anchor 1608 | 31D | 54A | 5.5 | 31D | 58A | 24.8 |
| Ancamine 1768 | 53A | 66A | 1.4 | 53A | 60A | 2.6 |
| Ancamide 502 | 50A | 45A | 3.2 | 50A | 48A | 7.0 |
| Ancamine MCA | 16A | Disintegrated after 1 week | — | 16A | Disintegrated after 1 week | — |
| Triethylene Tetramine | 21D | 68A | 1.5 | 21D | 72A | 2.1 |

TABLE 20

| | ADDUCT 1:1 EPIKOTE 816 + LP-33 | | | | CONTROL 1:1 EPIKOTE 816 + LP-33 | | | |
|---|---|---|---|---|---|---|---|---|
| CURATIVE TYPE | WORK LIFE HOURS | TACK FREE TIME HOURS | EXO-THERM °C. | CURED HARDNESS SHORE | WORK LIFE HOURS | TACK FREE TIME HOURS | EXO-THERM °C. | CURED HARDNESS SHORE |
| Anchor 1608 | 3 | 4.5 | 32 | 26D | 0.25 | 0.5 | 105 | 35D |
| Ancamine 1768 | 4.5 | 25 | 30 | 46A | 2 | Overnight | 65 | 55A |
| Ancamine 502 | Overnight | 28 | 30 | 53A | 1.25 | Overnight | 64 | 53A |
| Ancamine MCA | Overnight | 31 | 27 | 22A | 9-12 | Overnight | 36 | 35A |
| Triethylene Tetramine | 4 | Overnight | 26 | 26D | 1.33 | Overnight | 63 | 27D |

TABLE 21

1:1 EPIKOTE 816 + LP-33 ADDUCT

| | ROOM TEMPERATURE IMMERSION | | | 60° C. IMMERSION | | |
|---|---|---|---|---|---|---|
| CURATIVE TYPE | INITIAL CURED HARDNESS SHORE | HARDNESS AFTER ONE MONTH'S WATER IMMERSION SHORE | VOLUME SWELL % | INITIAL CURED HARDNESS SHORE | HARDNESS AFTER ONE MONTH'S WATER IMMERSION SHORE | VOLUME SWELL % |
| Anchor 1608 | 26D | 17D | 3.9 | 26D | 16D | 14.0 |
| Ancamine 1768 | 46A | 23D | 1.6 | 46A | 17D | 3.1 |
| Ancamide 502 | 53A | 47A 1 week | 2.7 | 53A | 46A | 4.8 |
| Ancamine MCA | 22 | Degraded after 1 week | — | 22A | Degraded after 1 week | — |
| Triethylene Tetramine | 26D | 21D | 1.5 | 26D | 24D | 2.4 |

TABLE 22

1:1 EPIKOTE 816 + LP-33 CONTROL

| | ROOM TEMPERATURE IMMERSION | | | 60° C. IMMERSION | | |
|---|---|---|---|---|---|---|
| CURATIVE TYPE | INITIAL CURED HARDNESS SHORE | HARDNESS AFTER ONE MONTH'S WATER IMMERSION SHORE | VOLUME SWELL % | INITIAL CURED HARDNESS SHORE | HARDNESS AFTER ONE MONTH'S WATER IMMERSION SHORE | VOLUME SWELL % |
| Anchor 1608 | 35D | 60A | 4.5 | 35D | 72A | 20.6 |
| Ancamine 1768 | 55A | 76A | 1.5 | 55A | 61A | 3.1 |
| Ancamide 502 | 53A | 53A | 2.4 | 53A | 52A | 4.3 |
| Ancamine MCA | 35A | Degraded after 1 week | — | 35A | Degraded after 1 week | — |
| Triethylene Tetramine | 27D | 75A | 1.4 | 27D | 83A | 2.5 |

TABLE 23

| | ADDUCT 1:1 EPIKOTE 213 + LP-3 | | | | CONTROL 1:1 EPIKOTE 213 + LP-3 | | | |
|---|---|---|---|---|---|---|---|---|
| CURATIVE TYPE | WORK LIFE Hours | TACK FREE TIME Hours | EXO- THERM °C. | CURED HARDNESS Shore | WORK LIFE Hours | TACK FREE TIME Hours | EXO- THERM °C. | CURED HARDNESS Shore |
| Anchor 1608 | 1.66 | 5 | 35 | 22D | 0.33 | 0.4 | 110 | 30D |
| Ancamine 1768 | Overnight | 29 | 32 | 35A | 2 | 24 | 58 | 25A |
| Ancamide 502 | Overnight | 30 | 26 | 25A | 0.83 | 16–24 | 78 | 36A |
| Ancamine MCA | 5 | Forms a putty | 30 | Too soft to measure | 16–24 | 25 | 30 | 7A |
| Triethylene Tetramine | 5.25 | Overnight | 30 | 20D | 0.66 | 3.5 | 86 | 66A |

TABLE 24

1:1 EPIKOTE 213 + LP-3 ADDUCT

| | ROOM TEMPERATURE IMMERSION | | | 60° C. IMMERSION | | |
|---|---|---|---|---|---|---|
| CURATIVE Type | INITIAL CURED HARDNESS Shore | HARDNESS AFTER 1 MONTH'S WATER IMMERSION Shore | VOLUME SWELL % | INITIAL CURED HARDNESS Shore | HARDNESS AFTER 1 MONTH'S WATER IMMERSION Shore | VOLUME SWELL % |
| Anchor 1608 | 22D | 32A | 3.8 | 22D | 40A | 13.9 |
| Ancamine 1768 | 35A | 39A | 1.3 | 35A | | |
| Ancamide 502 | 25A | 14A | 4.2 | 25A | 21A | 7.3 |
| Ancamine MCA | — | — | — | — | — | — |
| Triethylene Tetramine | 20D | 57A | 1.6 | 20D | 59A | 3.1 |

TABLE 25

1:1 EPIKOTE 213 + LP-3 CONTROL

| | ROOM TEMPERATURE IMMERSION | | | 60° C. IMMERSION | | |
|---|---|---|---|---|---|---|
| CURATIVE Type | INITIAL CURED HARDNESS Shore | HARDNESS AFTER 1 MONTH'S WATER IMMERSION Shore | VOLUME SWELL % | INITIAL CURED HARDNESS Shore | HARDNESS AFTER 1 MONTH'S WATER IMMERSION Shore | VOLUME SWELL % |
| Anchor 1608 | 30D | 48A | 4.8 | 30D | 43A | 27.3 |
| Ancamine 1768 | 25A | 63A | 2.1 | 25A | Samples stuck together | — |
| Ancamide 502 | 36A | 35A | 3.0 | 36A | 32A | 5.7 |
| Ancamine MCA | 7A | — | — | 7A | — | — |
| Triethylene Tetramine | 66A | 64A | 1.8 | 66A | 62A | 2.4 |

TABLE 26

| | ADDUCT 1:1 EPIKOTE 213 + LP-33 | | | | CONTROL 1:1 EPIKOTE 213 + LP-33 | | | |
|---|---|---|---|---|---|---|---|---|
| CURATIVE Type | WORK LIFE Hours | TACK FREE TIME Hours | EXO-THERM °C. | CURED HARDNESS Shore | WORK LIFE Hours | TACK FREE TIME Hours | EXO-THERM °C. | CURED HARDNESS Shore |
| Anchor 1608 | 2 | 4.5 | 37 | 80A | 0.33–0.5 | 0.5 | 116 | 42D |
| Ancamine 1768 | 8–23 | 48 | 34 | 33A | 2 | 24 | 60 | 30A |
| Ancamide 502 | 8–23 | 31 | 27 | 48A | 1.5 | Overnight | 62 | 15D |
| Ancamine MCA | 8–22 | 72 | 30 | 10A | Overnight | 26 | 27 | 29A |
| Triethylene Tetramine | 4 | 24 | 31 | 73A | 1.2 | 3.5 | 75 | 28D |

TABLE 27

| | 1:1 EPIKOTE 213 + LP-33 ADDUCT | | | | | |
|---|---|---|---|---|---|---|
| | ROOM TEMPERATURE IMMERSION | | | 60° C. IMMERSION | | |
| CURATIVE Type | INITIAL CURED HARDNESS Shore | HARDNESS AFTER 1 MONTH'S WATER IMMERSION Shore | VOLUME SWELL % | INITIAL CURED HARDNESS Shore | HARDNESS AFTER 1 MONTH'S WATER IMMERSION Shore | VOLUME SWELL % |
| Anchor 1608 | 80A | 54A | 3.1 | 80A | 48A | 13.1 |
| Ancamine 1768 | 33A | 21D | 1.4 | 33A | 42A | Samples stuck together after 1 wk's immersion |
| Ancamide 502 | 48A | 33A | 2.4 | 48A | 36A | 5.4 |
| Ancamine MCA | 10A | Disintegrated after 1 wk's immersion | — | 10A | Disintegrated after 1 wk's immersion | — |
| Triethylene Tetramine | 73A | 19A | 1.5 | 73A | 20D | 1.7 |

TABLE 28

| | 1:1 EPIKOTE 213 + LP-33 CONTROL | | | | | |
|---|---|---|---|---|---|---|
| | ROOM TEMPERATURE IMMERSION | | | 60° C. IMMERSION | | |
| CURATIVE Type | INITIAL CURED HARDNESS Shore | HARDNESS AFTER 1 MONTH'S WATER IMMERSION Shore | VOLUME SWELL % | INITIAL CURED HARDNESS Shore | HARDNESS AFTER 1 MONTH'WATER IMMERSION Shore | VOLUME SWELL % |
| Anchor 1608 | 42D | 65A | 4.2 | 42D | 68A | 17.2 |
| Ancamine 1768 | 30A | 76A | 1.6 | 30A | 38A | 3.8 |
| Ancamide 502 | 15D | 46A | 2.4 | 15D | 44A | 4.5 |
| Ancamine MCA | — | — | — | — | — | — |
| Triethylene Tetramine | 28D | 71A | 1.3 | 28D | 70A | 1.3 |

EXAMPLE 18

The physical properties of a cured 1:0.25 Epikote 1001+LP-33 adduct were tested. The adduct was evaluated as an unfilled, spatula applied coating on shot blasted mild steel plates. The coating was cured with Ancamine 1608, an aliphatic amine. The cure characteristics of the coating are tabulated as follows:

| ADDUCT | EPOXIDE CONTENT OF ADDUCT Moles Kg$^{-1}$ | ANCAMINE 1608 LEVEL phr | THIN FILM TACK FREE TIME HOURS |
|---|---|---|---|
| 1:0.25 Epikote 1001 + LP-33 | 1.03 | 4.12 | 8 |

Two samples of adduct, differing only in coating thickness were prepared. The samples were assessed for adhesion, impact, salt spray and UV resistance. The test results are shown as follows:

| | Sample A | Sample B |
|---|---|---|
| Coating thickness (μ) | 300–350 | 110–260 |
| Cross-hatch adhesion° | 0 | 0 |
| Reverse impact (inch lbs) | >160 | >160 |
| Direct Impact (inch lbs) | >160 | 80 |
| AFTER 312 HOURS UV EXPOSURE | | |
| Cross Hatch Adhesion | 0 | — |
| Reverse Impact (inch lbs) | 160 | — |
| AFTER 200 HOURS SALT SPRAY EXPOSURE | | |
| Cross-Hatch Adhesion | 0 | — |
| Corrosion Protection | No Corrosion Spread No Loss of adhesion | — |

| -continued | |
|---|---|
| Sample A | Sample B |
| No loss of flexibility | — |

*Cross hatch adhesion is assessed on a scale graded from zero to six. A reading of zero implies excellent adhesion. A reading of six = poor adhesion.

ADDUCT MICROSTRUCTURE

Cured samples of the 1:1 Excess Epoxy Adduct Epikote 213LP-33 and the 1:1 Epikote 213+LP-33 Control were subjected to Transmission Electron Miscroscopy examination of their miscrostructure.

Three samples were analyzed:
(a) 1:1 Epikote 213+LP-33 Control cured at room temperature with 10 pbw of EH-330.
(b) 1:1 Excess Epoxy Adduct Epikote 213+LP-33 cured at room temperature with 10 pbw of EH-330.
(c) 1:1 Excess Epoxy Adduct Epikote 213+LP-33 cured for 1 hour at 60° C. with 10 pbw of EH-330.

It was anticipated that the three samples would show a different microstructure because of their different modes of manufacture and temperature of cure.

The test results are as follows:
1. All the samples have a microstructure indicative of two phase materials.
2. The dispersed phase believed to be the LP-33 is most finely dispersed in the room temperature cured Excess Epoxy Adduct sample. Degree of dispersion being ranked in the order: Room Temp. Cured Adduct>LP/Epoxy Control >>60° C. Cured Adduct.

We claim:

1. A curable liquid polymer composition having a stable viscosity when stored for at least two weeks at 25° C. prior to curing, said composition containing a polymer formed by an addition reaction between epoxy groups of an epoxy polymer having at least two epoxy groups per molecule and an epoxy content of not more than 6 mole/Kg and mercaptan groups of a polysulfide polymer having at least two mercaptan groups per molecule, said polysulfide polymer being in stoichiometric excess whereby said curable liquid polymer has functional mercaptan groups.

2. The liquid polymer composition of claim 1 which is made by an uncatalyzed reaction.

3. The liquid polymer composition of claim 1 which has a viscosity of not more than about 100 Pas at 25° C.

4. The liquid polymer composition of claim 3 which has a viscosity of not more than about 60 Pas at 25° C.

5. The liquid polymer composition of claim 1 which has a molecular weight in the range from about 1600 to about 5000.

6. The liquid polymer composition of claim 5 which has a molecular weight of not more than about 3000.

7. The liquid block copolymer of claim 1 wherein the major component of the copolymer is in the form of an ABA block copolymer.

8. The liquid polymer composition of claim 1 wherein the molar ratio of mercaptan groups to epoxy groups in the original polymers is in the range from about 1.5:1 to about 3:1.

9. A process for preparing a curable liquid polymer composition having a stable viscosity when stored for at least two weeks at 25° C. prior to curing, which comprises reacting an epoxy polymer having at least two epoxy groups per molecule and an epoxy content of not more than 6 mole/Kg with a polysulfide polymer having at least two mercaptan groups per molecule, one of said polymers being in stoichiometric excess, in the absence of a catalyst, at a temperature of from 10° C. to 60° C., whereby said curable liquid polymer composition has terminal functional groups selected from one of epoxy groups and mercaptan groups.

10. The process of claim 9 wherein said epoxy polymer has an epoxide content of from about 2 to 6 mole/kg.

11. The process of claim 9 wherein said epoxy polymer is a solid.

12. The process of claim 9 wherein said epoxy polymer is a liquid resin having a viscosity from about 0.5 to about 20 Pas.

13. The process of claim 9 wherein said epoxy polymer has an average molecular weight of from about 250 to about 600.

14. The process of claim 9 where said polysulfide polymer has a viscosity from about 0.5 to about 2.5 Pas.

15. The process of claim 9 wherein said polysulfide polymer has an average molecular weight of from about 500 to about 12,000.

16. The process of claim 15 wherein said polysulfide polymer has an average molecular weight of from about 500 to about 2000.

17. The process of claim 9 wherein said polysulfide polymer has an average of from 2 to about 2.5 mercaptan groups per molecule.

18. The process of claim 9 wherein said polysulfide polymer has a mercaptan content of from about 1.5 to about 2.5 mole/kg.

19. The process of claim 9 wherein the molar ratio of epoxide groups in said epoxy polymer to mercaptan groups in said polysulfide polymer is in the range from about 2:1 to about 7.5:1.

20. The process of claim 9 wherein the molar ratio of mercaptan groups in the polysulfide polymer to epoxy groups in the epoxy polymer is in the range from about 1.5:1 to about 3:1.

21. The process of claim 9 wherein the reaction product is stored as an uncured liquid polymer composition and subsequently cured with a curing agent to form a solid product.

22. The process of claim 21 wherein the reaction product contains epoxy groups and said curing agent is an amine catalyst.

23. A process for preparing a curable liquid polymer composition having a stable viscosity when stored for at least two weeks at 25° C. prior to curing, which comprises reacting an epoxy polymer which is a solid having at least two epoxy groups per molecule and an epoxy content of not more than 6 mole/kg with a polysulfide polymer having at least two mercaptan groups per molecule, one of said polymers being in stoichiometric excess, by heating a mixture of said polymers, in the absence of a catalyst, to about 70° C., then removing the source of heat and allowing the reaction to proceed to completion.

* * * * *